(12) United States Patent　　　(10) Patent No.: US 12,684,348 B2
Feldman et al.　　　　　　　　　 (45) Date of Patent: Jul. 14, 2026

(54) NETWORK MANAGEMENT IN AN INTERNET-OF-THINGS (IOT) ENVIRONMENT

(71) Applicant: Siemens Aktiengesellschaft, Munich (DE)

(72) Inventors: Daniel Feldman, New York, NY (US); Jean-Christoph Heyne, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 367 days.

(21) Appl. No.: 18/469,608

(22) Filed: Sep. 19, 2023

(65) Prior Publication Data

US 2025/0097699 A1　　Mar. 20, 2025

(51) Int. Cl.
| | |
|---|---|
| *G06F 15/16* | (2006.01) |
| *H04L 67/12* | (2022.01) |
| *H04W 12/037* | (2021.01) |
| *H04W 12/06* | (2021.01) |
| *H04W 12/73* | (2021.01) |
| *H04W 84/12* | (2009.01) |

(52) U.S. Cl.
CPC ............. *H04W 12/06* (2013.01); *H04L 67/12* (2013.01); *H04W 12/037* (2021.01); *H04W 12/73* (2021.01); *H04W 84/12* (2013.01)

(58) Field of Classification Search
CPC ... H04W 12/06; H04W 12/73; H04W 12/037; H04W 84/12; H04L 67/12
See application file for complete search history.

(56) References Cited

U.S. PATENT DOCUMENTS

| | | | |
|---|---|---|---|
| 2017/0070390 A1 | 3/2017 | Poola et al. | |
| 2019/0296969 A1* | 9/2019 | Zimny ................... | H04W 12/03 |
| 2021/0136545 A1* | 5/2021 | Hutz ........................ | H04W 4/50 |
| 2021/0195501 A1* | 6/2021 | Bittner .............. | H04W 36/0077 |
| 2023/0019378 A1* | 1/2023 | Akiba ................... | H04W 60/06 |

FOREIGN PATENT DOCUMENTS

| | | |
|---|---|---|
| EP | 3346572 A1 | 7/2018 |
| JP | 7231251 B2 | 3/2023 |

* cited by examiner

*Primary Examiner* — Normin Abedin

(57)　　　　　　ABSTRACT

A network management system in an Internet-of-Things (IoT) environment includes a parent device with a first default configuration including a service set identifier (Wi-Fi SSID) that uniquely identifies a Wi-Fi network, a child device, wherein the child device is configured to identify the Wi-Fi SSID of the parent device, a network, wherein the parent device and the child device are configured to communicate via the network, and a network configuration module that is configured via computer executable instructions to lock the network, generate a second default configuration, provide the second default configuration to each child device, and turn off the second default configuration after the child device confirmed receipt of the second default configuration.

15 Claims, 3 Drawing Sheets

NETWORK MANAGEMENT IN AN INTERNET-OF-THINGS (IOT) ENVIRONMENT

BACKGROUND

1. Field

Aspects of the present disclosure generally relate to network management in an Internet-of-Things environment. More specifically, various embodiments relate to Wi-Fi network management of parent-child devices and systems in an Internet-of-Things environment. The term 'Internet-of-Things' is herein also referred to as 'IoT'.

2. Description of the Related Art

The IoT refers to a network of physical devices, vehicles, appliances, and other physical objects that are embedded with sensors, software and network connectivity that allows them to collect and share data. These devices, also known as 'smart devices' or 'IoT-devices' can range from simple 'smart home' devices like smart thermostats, to wearables like smartwatches and RFID-enabled clothing, to complex industrial machinery and transportation systems.

IoT enables these smart devices to communicate with each other and with other internet-enabled devices, like smartphones and gateways, creating a vast network of interconnected devices that can exchange data and perform a variety of tasks autonomously. This can include everything from monitoring environmental conditions in farms, to managing traffic patterns with smart cars and other smart automotive devices, to controlling machines and processes in factories, to tracking inventory and shipments in warehouses.

Examples of IoT-devices include electric vehicle supply equipment, also referred to as 'EVSE', which is also known as charging station or charge point for an electric vehicle. Such charging stations are typically owned by a company/provider that manages these charging stations. For example, when installed, the charging stations are associated and connected, via a network, to a platform owned or managed by the company/provider. Data and information can be exchanged between the charging stations and the platform as well as configurations made to the charging stations.

An example of a configuration of charging stations includes a parent-child setup, wherein a parent charging station may be connected to one or more child charging stations. The parent charging station serves as a communication hub and is configured to communicate and manage the child devices. The parent charging station includes more functions and features and is typically more costly compared to the child devices. Thus, a parent-child setup reduces costs and controls data streams. However, the child devices may need to be configured individually to connect to a specific parent device, which can be a tedious process. Thus, there may exist a need for an improved system and method for connecting and managing multiple parent-child devices within a network.

SUMMARY

Various embodiments relate to Wi-Fi network management of parent-child devices and systems in an Internet-of-Things (IoT) environment.

A first aspect of the present disclosure provides a network management system in an Internet-of-Things (IoT) environment, the system comprising a parent device comprising a first default configuration including a service set identifier (Wi-Fi SSID) that uniquely identifies a Wi-Fi network, a child device, wherein the child device is configured to identify the Wi-Fi SSID of the parent device, a network, wherein the parent device and the child device are configured to communicate via the network, and a network configuration module that is configured via computer executable instructions to lock the network, generate a second default configuration, provide the second default configuration to each child device, and turn off the second default configuration after the child device confirmed receipt of the second default configuration.

A second aspect of the present disclosure provides a method for network management comprising locking a network, the network being shared and utilized by a parent device and a child device, generating a default configuration comprising a service set identifier (Wi-Fi SSID) that uniquely identifies a Wi-Fi network, transmitting the default configuration to the child device, the child device being configured to identify the Wi-Fi SSID of the parent device, and turning off the default configuration after the child device confirmed receipt of the default configuration.

A third aspect of the present disclosure provides a non-transitory computer readable medium encoded with processor executable instructions that when executed by at least one processor, cause the at least one processor to carry out a method for network management as described herein.

DETAILED DESCRIPTION

To facilitate an understanding of embodiments, principles, and features of the present disclosure, they are explained hereinafter with reference to implementation in illustrative embodiments. In particular, they are described in the context of being systems and methods for network management in an Internet-of-Things (IoT) environment, for example in connection with electric vehicle charging stations (EVSE). Embodiments of the present disclosure, however, are not limited to use in the described systems, devices, or methods.

Figure 1:
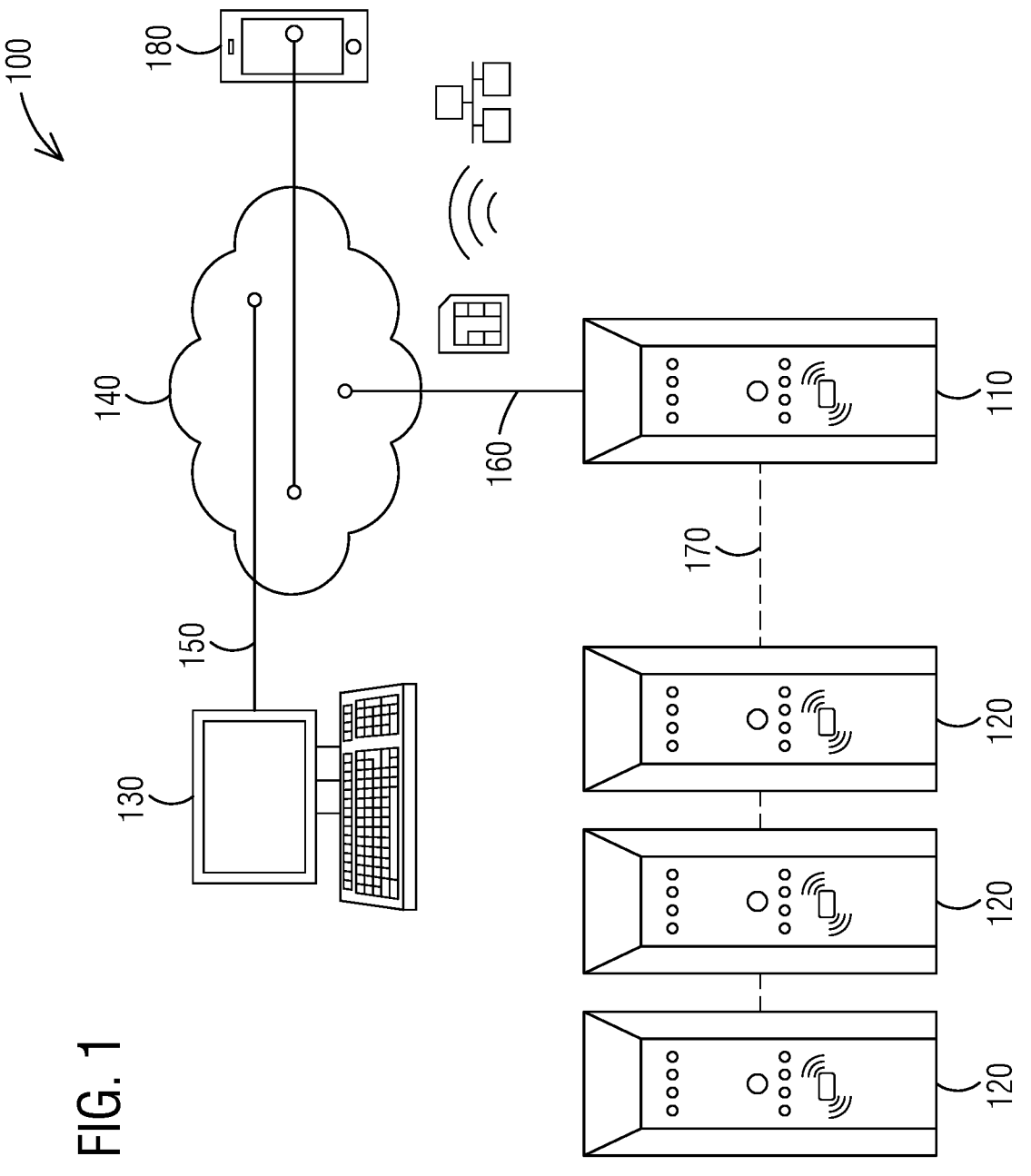
FIG. 1 illustrates a diagram of a system including a parent-child configuration in accordance with an exemplary embodiment of the present disclosure.

FIG. 1 illustrates a diagram of a system 100 including a parent-child configuration in accordance with an exemplary embodiment of the present disclosure. In an example, the system 100 includes a parent device 110 and multiple child devices 120. The parent device 110 and the child devices 120 can be for example electric vehicle charging stations (EVSE). However, it should be noted that the described system 100 and associated methods may apply to many other types of devices 110, 120 that include parent-child configurations and communications, such as industrial, electric, or electronic devices or systems etc.

The system 100 illustrates a device management system 130, which is for example operated by a manufacturer or provider, that communicates for example settings, configurations, new firmware/software updates, payment systems, load management, access control, etc. for the parent/child devices 110, 120. The device management system 130 may also be referred to as the 'backend' or 'backend connection'.

The parent/child devices 110, 120 and the device management system 130 communicate via cloud 140 and cloud connection(s) 150, 160. In general, the cloud 140 refers to servers that are accessed over a network, such as the Internet, and the software and databases that run those servers. Cloud servers are in data centers all over the world. Cloud computing enables users and organizations to access and store information without managing their own physical devices or IT infrastructure. An example of an application protocol for communication between the charging devices 110, 120 and the device management system 130 (backend) is Open Charge Point Protocol (OCPP). It should be noted that other communication protocols or communication methods may be used between the parent/child devices 110, 120 and the backend 130.

In an embodiment, information, settings, or configurations are downloaded and verified by the parent device 110 over a mobile (cloud) connection 160 via cellular, Wi-Fi, or Ethernet connection. The mobile connection(s) 160 are secure connections that are encrypted by one or more security protocols to ensure security of the data flowing between the different devices and systems. The parent device 110 then shares and transmits the information, settings, or configurations with the child devices 120, as necessary or required. Thus, the parent device 110 shares network connections with the child devices 120. More specifically, the parent device 110 shares an Internet connection 170, such as Ethernet or mobile, via Wi-Fi with the child devices 120.

The system 100 may further comprise a mobile application, also referred to as 'mobile app', illustrated via a mobile device 180, for configuration, control, and monitoring of the parent device 110 or the management system 130.

Figure 2:
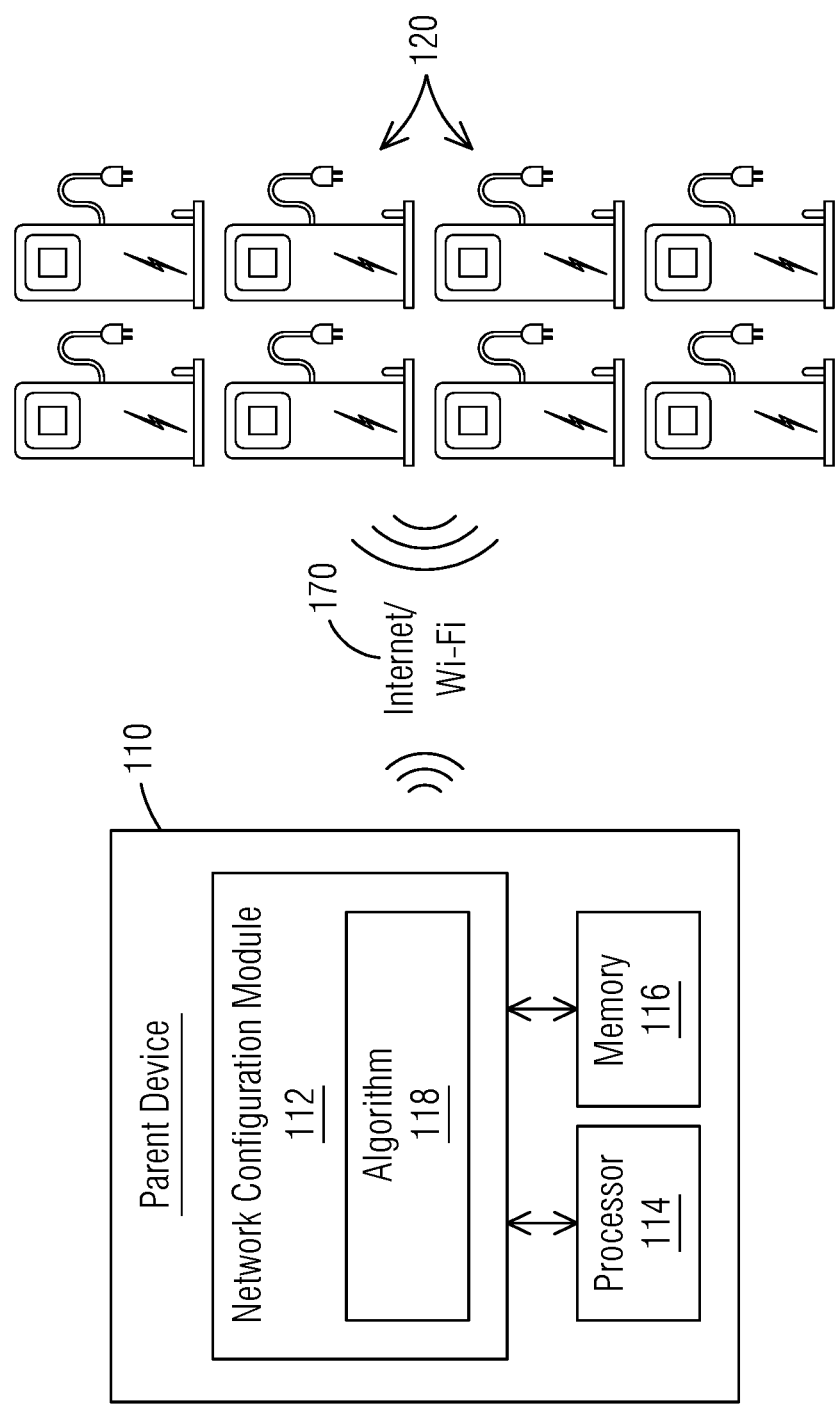
FIG. 2 illustrates a diagram of a parent-child configuration for network management in an IoT environment in accordance with an exemplary embodiment of the present disclosure.

FIG. 2 illustrates a diagram of a parent-child configuration for network management in an IoT environment in accordance with an exemplary embodiment of the present disclosure.

As described earlier, examples of IoT-devices include electric vehicle supply equipment, also referred to as 'EVSE', which is also known as charging station or charge point for an electric vehicle. Such charging stations are typically owned by a company/provider that manages these charging stations. For example, when installed, the charging stations are associated and connected, via a network, to a platform owned or managed by the company/provider. Data and information can be exchanged between the charging stations and the platform as well as configurations made to the charging stations.

An example of a configuration of charging stations includes a parent-child setup, wherein a parent charging station may be coupled to one or more multiple child charging stations. The parent charging station serves as a communication hub and is configured to communicate and manage the child devices. The parent charging station includes more functions and features and is typically more costly compared to the child devices.

As described with reference to FIG. 1, the child devices 120 (without cellular connectivity and only with Internet/Wi-Fi connection) are connected to the parent device 110 that has cellular connectivity in addition to Internet/Wi-Fi (mobile or Ethernet) connection. Typically, the child devices 120 come out of factory without being configured to connect or 'talk' to any specific Internet/Wi-Fi network. Thus, each child device 120 may need to be configured individually to get the child devices 120 connect to the parent device 110 via the network (Internet/Wi-Fi).

The described systems and methods provide improved, automated solutions for configuring and connecting one or more child devices 120 to a parent device 110.

In an exemplary embodiment of the present disclosure, the parent device 110 comprises a first default configuration including a service set identifier (SSID) that uniquely identifies a Wi-Fi network, also referred to as 'Wi-Fi SSID'. The parent device 110 and child device(s) 120 are configured to communicate via the network 170, which is an (Ethernet or mobile) Internet via Wi-Fi connection. One or more child device(s) 120 is/are configured to identify the Wi-Fi SSID of the parent device 110.

In an example, an EVSE parent device 110 is preconfigured with a Wi-Fi SSID composed of a descriptive string such as 'VersiCharge' followed by unique numbers. A default password is associated with the Wi-Fi SSID, which can be identical to the SSID. This is called the 'default configuration'. The parent device 110 advertises the Wi-Fi SSID as a hotspot when the parent device 110 is in a 'network unlocked' state. The default password for the Wi-Fi SSID is not advertised by the parent device 110.

The state 'network unlocked' or 'open network' means a wireless network, e.g. network 170, that is unsecured and can be used by any device in the vicinity of the network. EVSE child devices 120 are pre-programmed to identify any hotspot with the agreed upon descriptive string (in this example 'VersiCharge') followed by any numbers, using a for example password identical to the SSID. The EVSE child devices 120 are aware that it is connected to a 'network unlocked' configuration of the EVSE parent device 120.

In an exemplary embodiment of the present disclosure, a network configuration module 112 is configured via computer executable instructions to perform a specific method, such as algorithm 118. The network configuration module 112 is operably coupled to or comprises one or more processor(s) 114 and memory(s) 116. The memory 116 may include any of a wide variety of memory devices including volatile and non-volatile memory devices, and the at least one processor 114 may include one or more processing units.

The algorithm 118, in combination with the processor 114 and memory 116, executes a method for secure and automated connection of child devices 120 to the parent device 110. The network configuration module 112 is configured to lock the network 170, generate a second default configuration, transmit the second default configuration to each child device 120, and turn off the second default configuration after each child device 120 confirmed receipt of the second default configuration. Turning off the second default configuration can include for example to halt or stop transmitting the default configuration.

Referring to our example of EVSE parent/child devices 110, 120, the network configuration module 112 receives a command or signal to 'lock' the network 170 created by the EVSE parent device 110. For example, the network configuration module 112 may receive the command to lock (or unlock) the network 170 from an administrator (of the operator or provider) of the parent/child devices 110, 120. Such a command or signal may be entered or provided via a mobile app on the mobile device 180, see FIG. 1.

The expressions 'lock, 'locked' or 'locking the network' describes or refers to network configuration that is not pre-defined or pre-agreed upon, it is unknown and hard to identify by other devices or people. The default configuration is technically a secured configuration because it uses WPA2 or WPA3 encryption (Wi-Fi Protected Access 2/3). At the same time, the Wi-Fi SSID/password combination is known, at least to the parent/child devices 110, 120.

To create a 'network locked' state, a new, random combination of a Wi-Fi SSID and password is generated for the parent device 110. The device management system (backend) 130 and/or the parent device 110 is configured to generate the random combination. For example, the backend 130 may generate the random combination of the Wi-Fi SSID and password, or the parent device 110 creates the combination. In other examples, the backend 130 may create the Wi-Fi SSID and the parent device 110 may create the password for the Wi-Fi SSID.

The new default configuration is transmitted to each child device 120 in an encrypted channel. An encrypted channel is a secure communication channel, implementing one or more security protocols or algorithms. After there is confirmation that all child devices 120 have received the Wi-Fi SSID-password combination, the parent device 110 is configured to turn off, e.g., stop transmitting, the default SSID/password configuration and moves to a secure network configuration. The child devices 120 re-connect to the new secure network.

In an example, turning off or transmission of the default configuration is stopped automatically after a pre-defined period. For example, transmission or broadcasting of the newly generated Wi-Fi SSID-password combination may be stopped after a certain time reasonable for all child devices 120 to connect, for example 30 minutes or one (1) hour, etc. In another example, the parent device 110 is configured to turn off the Wi-Fi SSID-password combination after all child devices 120 have been added to the network 170. If for example four (4) child devices 120 are to be added to the network 170, this information may be sent together with the lock-command to the parent device 110. After the parent device 110 has received confirmation from four child devices 120, the default Wi-Fi SSID-password combination is not transmitted or available/visible to the child devices 120 any longer.

As noted previously, an administrator can trigger a 'network unlock' or 'network lock' command. Such a command or signal can be triggered at any point in time to add new child devices 120 to a network, e.g., network 170, and to a parent device 110, or to replace a child device 120. Every time the local network 170 moves from an unlocked to a locked state, a new random Wi-Fi SSID/password combination is generated. Such a randomly generated network provides an advantage of making it impossible for strange or other 'non-belonging' devices to use the network/hotspot of the parent device 110 to connect to the Internet, which increases the solution reliability and network/data security.

The network configuration module 112 may be embodied as software or a combination of software and hardware. The network configuration module 112 may be a separate module or may be an existing module programmed to perform a method as described herein. For example, the network configuration module may be incorporated, for example programmed, into an existing system or platform, such as the parent device 110, by means of software.

The network configuration module 112 can be implemented by the parent device 110, as illustrated in FIG. 2. In other embodiments, the network configuration module 112 can be implemented by the device management system 130, or in a distributed manner by a combination of the parent device 110 and the device management system ('backend') 130.

Figure 3:
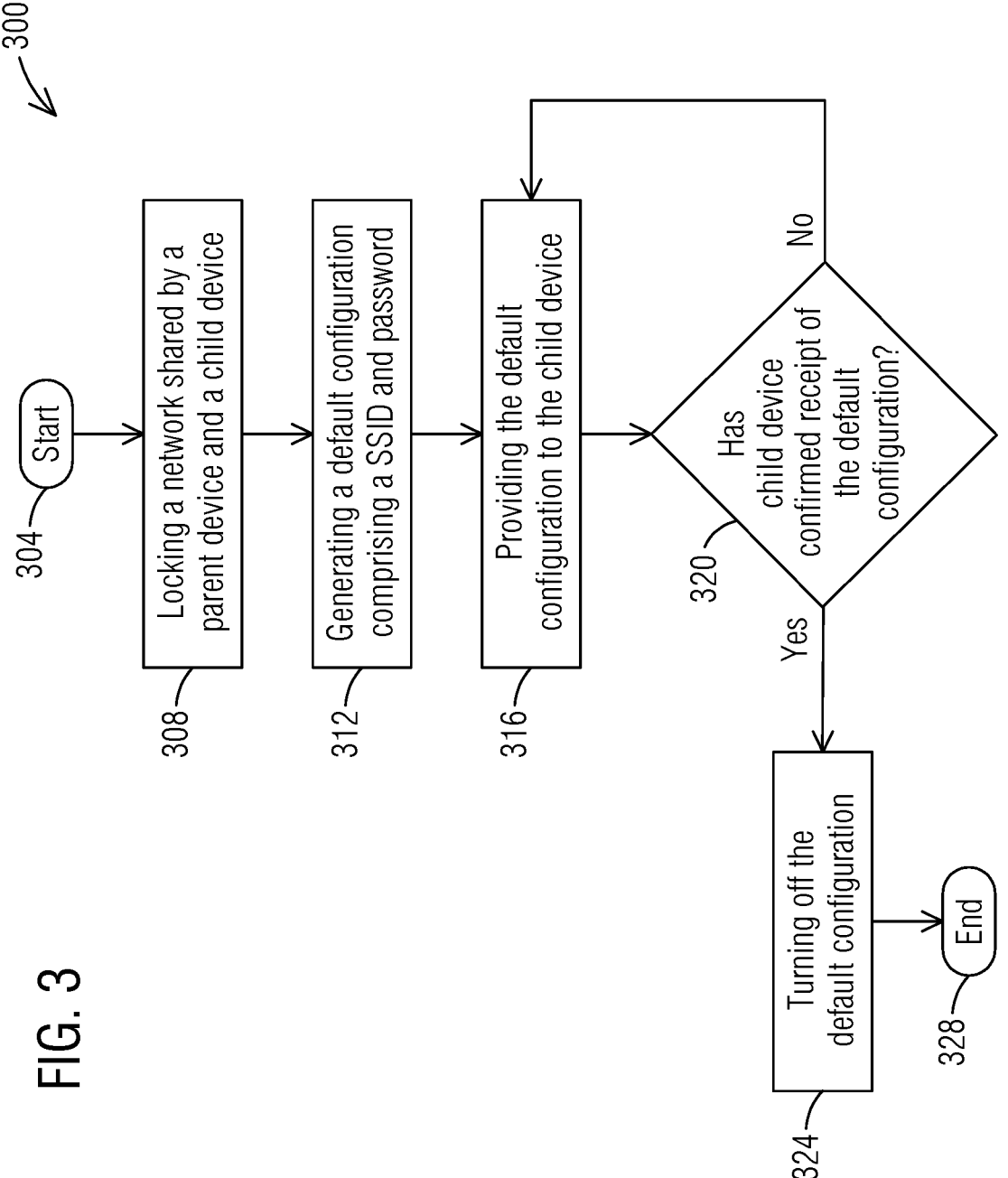
FIG. 3 illustrates a flow chart of a method for network management in an IoT-environment in accordance with an exemplary embodiment of the present disclosure.

FIG. 3 illustrates a flow chart of a method 300 for network management in an IoT-environment in accordance with an exemplary embodiment of the present disclosure. While the method 300 is described as a series of acts or steps that are performed in a sequence, it is to be understood that the method 300 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method may be performed with a system 100 and components, specifically parent device 110, child device(s) 120, and network configuration module 112 as described with reference to FIG. 1 and FIG. 2. The method 300 may start at 304. The method 300 comprises, utilizing network configuration module 112 and processor 114, act 308 locking a network shared by the parent device 110 and the child device 120, act 312 generating a default configuration comprising a SSID, specifically a Wi-Fi SSID, and act 316 providing or transmitting the default configuration to the child device 120. The default configuration further comprises a password for the Wi-Fi SSID, wherein the default configuration including Wi-Fi SSID and password is transmitted in an encrypted manner to one or more child device(s) 120 located in the vicinity of the locked network 170.

After the one or more child device(s) 120 confirmed receipt of the default configuration, by providing or sending a confirmation signal, transmission of the default configuration is halted, or the default configuration is turned off, see act 320 and act 324. Halted, stopped, or turned off means that the default configuration is not transmitted any longer or is not visible or available to any device in the vicinity of the network 170. Then, the one or more child device(s) 120 that received the new default configuration re-connect to the network 170.

The method 300 further comprises receiving a command or signal to lock or unlock the network 170. The command or signal can be provided an administrator, for example personnel/staff of the operator of the devices 110, 120 or can be a signal triggered by another device or system, such as the device management system (backend) 130.

As noted, in act 324, transmission of the default configuration is halted or turned off after the child device(s) 120 confirmed receipt of the configuration. The transmission or provision of the default configuration can be turned off automatically after a pre-defined period, e.g., time window of for example 60 minutes etc., or can be turned off after a pre-defined number of child device(s) 120 has/have been added to the network 170.

It should be appreciated that the described method 300 may include additional acts and/or alternative acts corresponding to the features described previously with respect to the system 100, parent device 110, network configuration module 112 and child device(s) 120 (see FIG. 1 and FIG. 2).

Summarizing, the described system 100, elements and method 300 provide improved, automated solutions for configuring and connecting one or more child device(s) 120 to a parent device 110. As noted, a 'network unlock' or 'network lock' command can be triggered at any point in time to add new child devices 120 to a network (network 170) and a parent device (parent device 110), or to replace a child device 120. Every time the local network moves from unlocked to locked, a new random Wi-Fi SSID/password combination is generated, thus providing network security and solution reliability.

It should be appreciated that acts associated with the above-described methodologies, features, and functions (other than any described manual acts) may be carried out by one or more data processing systems, such as for example network configuration module 112, via operation of at least one processor 114. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the module 112 and/or processor 114 that is described or claimed as being configured to carry out a particular described/claimed process or function may correspond to a CPU that executes computer/processor executable instructions stored in a memory in form of software and/or firmware to carry out such a described/ claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the module 112/processor 114 with the executable instructions (e.g., software/firmware apps) loaded/installed into a memory (volatile and/or non-volatile), which are currently being executed and/or are available to be executed by the processor 114 to cause the processor 114 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/ claimed processor that is configured to carry out the particular processes and functions described/claimed herein.

Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/ processor executable instructions may include a routine, a sub-routine, programs, applications, modules, libraries, and/ or the like. Further, it should be appreciated that computer/ processor executable instructions may correspond to and/or may be generated from source code, byte code, runtime code, machine code, assembly language, Java, JavaScript, Python, Julia, C, C #, C++, Scala, R, MATLAB, Clojure, Lua, Go or any other form of code that can be programmed/ configured to cause at least one processor to carry out the acts and features described herein. Still further, results of the described/claimed processes or functions may be stored in a computer-readable medium, displayed on a display device, and/or the like.

The invention claimed is:

1. A network management system in an Internet-of-Things (IoT) environment, the system comprising:
   a parent device comprising a first default configuration including a service set identifier that uniquely identifies a Wi-Fi network (Wi-Fi SSID),
   a child device configured to identify the Wi-Fi SSID of the parent device,
   a network, wherein the parent device and the child device are configured to communicate via the network, and
   a network configuration module comprising at least one processor and memory storing computer executable instructions that, when executed by the at least one processor, cause the at least one processor to
      lock the network by generating a random combination of a Wi-Fi SSID and password as the second default configuration,
      transmit the second default configuration to each child device in an encrypted channel, and
      turn off the second default configuration after each child device confirmed receipt of the second default configuration,
      wherein the child device re-connects to the network using the second default configuration.

2. The network management system of claim 1,
further comprising a device management system comprising at least one processor configured to communicate with the parent device, wherein the SSID and the password is generated by the parent device and/or the device management system.

3. The network management system of claim 1,
wherein the network configuration module is implemented by the parent device, the device management system, or in a distributed manner by a combination of the parent device and the device management system.

4. The network management system of claim 1,
wherein the network configuration module is configured to receive a command to lock or unlock the network.

5. The network management system of claim 4,
wherein the command to lock or unlock is provided by an administrator.

6. The network management system of claim 5,
wherein the command to lock or unlock is provided via a mobile app.

7. The network management system of claim 1,
wherein the parent device and the child device include electric vehicle charging stations (EVSE).

8. A method for network management comprising:
locking a network, the network being shared and utilized by a parent device and a child device, by generating a random combination of a Wi-Fi SSID and password as a default configuration,
transmitting the default configuration to the child device in an encrypted channel, the child device being configured to identify the Wi-Fi SSID of the parent device,
turning off the default configuration after the child device confirmed receipt of the default configuration, and
wherein the child device re-connects to the network using the default configuration.

9. The method for network management of claim 8,
wherein the method is performed by the parent device.

10. The method for network management of claim 8,
wherein the method is performed by the parent device in combination with a device management system, the device management system being configured to communicate with the parent device.

11. The method for network management of claim 10, wherein the password is generated by the parent device or the device management system.

12. The method of network management of claim 8, further comprising:

receiving a command to lock or unlock the network, the command being provided by an administrator.

13. The method of network management of claim 8, wherein the default configuration is turned off automatically after a pre-defined period.

14. The method of network management of claim 8, wherein the default configuration is turned off after a pre-defined number of child device(s) has been added to the network.

15. A non-transitory computer readable medium encoded with processor executable instructions that when executed by at least one processor, cause the at least one processor to carry out a method for network management as claimed in claim 8.

* * * * *